(No Model.)
F. H. HOHOFF.
LOCKING ATTACHMENT FOR BICYCLES.
No. 458,832. Patented Sept. 1, 1891.
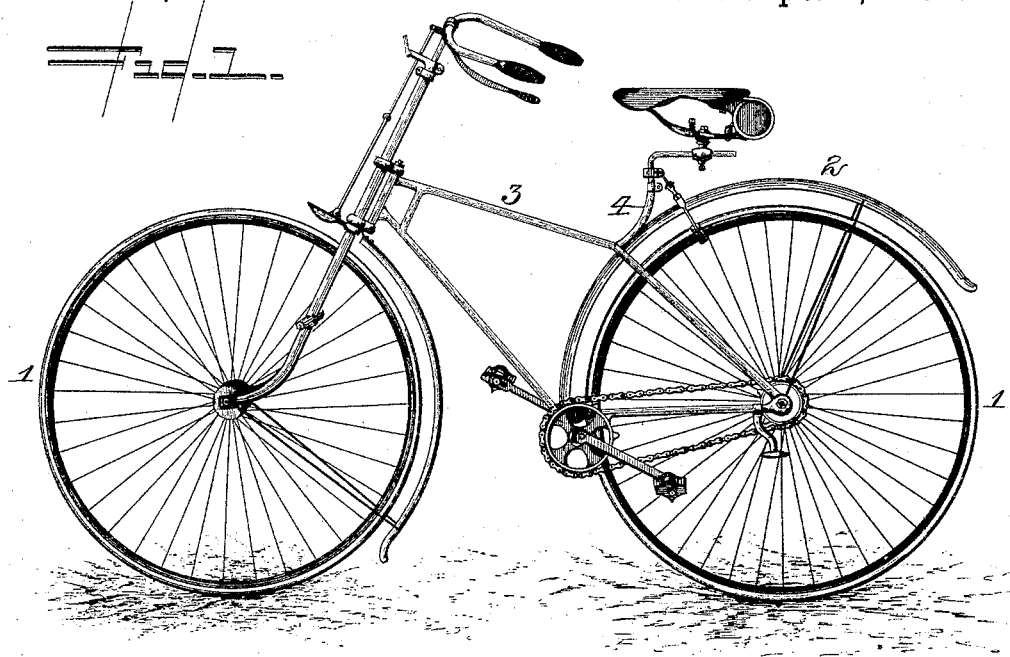
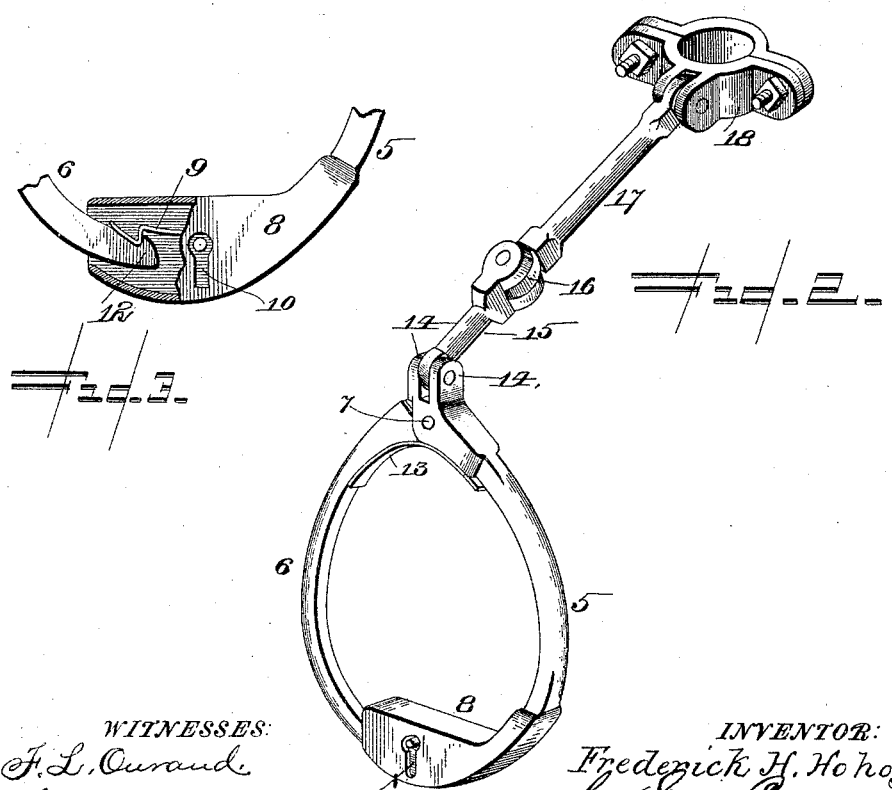
WITNESSES:
F. L. Durand
Jo. L. Coombs
INVENTOR:
Frederick H. Hohoff
by Sauss Bagger & Co
Attorneys

UNITED STATES PATENT OFFICE.

FREDERICK H. HOHOFF, OF WASHINGTON, DISTRICT OF COLUMBIA.

LOCKING ATTACHMENT FOR BICYCLES.

SPECIFICATION forming part of Letters Patent No. 458,832, dated September 1, 1891.

Application filed June 12, 1891. Serial No. 396,008. (No model.)

*To all whom it may concern:*

Be it known that I, FREDERICK H. HOHOFF, a citizen of the United States, and a resident of Washington, in the District of Columbia, have invented certain new and useful Improvements in Locking Attachments for Bicycles; and I do hereby declare that the following is a full, clear, and exact description of the invention, which will enable others skilled in the art to which it appertains to make and use the same, reference being had to the accompanying drawings, which form a part of this specification.

My invention relates to improvements in locking attachments for bicycles or velocipedes, by means of which the wheels may be connected with a stationary part of the apparatus when not in use, locking the same against rotation and preventing unauthorized use or stealing of the bicycle.

The invention consists in the novel construction of the device hereinafter fully described and claimed.

In the accompanying drawings, Figure 1 is a side view of a bicycle, showing my improved locking attachment applied thereto. Fig. 2 is a perspective view of the locking device detached. Fig. 3 is a sectional detail of the lock.

In the said drawings the bicycle shown in Fig. 1 is what is known as ordinary "Safety;" but it will be obvious that the invention can be used in connection with any of the usual forms or makes of velocipedes.

The numeral 1 designates the wheels, 2 the mud-guard or shield, 3 the connecting-bar, and 4 the seat-standard.

The locking device (shown more clearly in Fig. 2) comprises a pair of jaws 5 6, pivoted together at 7, one of the free ends thereof being provided with an enlarged head 8, which contains a spring locking-catch 9, of any ordinary construction. This head 8 is provided with a key-hole 10 for the insertion of a key to actuate the catch 9. The free end of the other jaw is formed with a hook 12, which engages with the catch 9.

The numeral 13 denotes a spring secured to one of the jaws, the free end thereof bearing against the other jaw, so as to keep the jaws distended when unlocked.

Pivoted in lugs 14 on one of the jaws is a short bar 15, which is also pivoted at 16 to a long bar 17, which in turn is pivoted to a bracket 18, made in two parts and adapted to encircle and be secured to the seat-standard of a bicycle or other part thereof. It will be seen that the pivot connection between bars 15 and 17 is at a right angle to the pivot connections by which said bars are respectively attached to the jaw and bracket, thus forming, as it were, a universal joint, thus allowing of a longitudinal play or movement of said bars at their points of connection with the jaw and bracket and a lateral play or movement where said bars are connected together.

In practice the bracket is secured to the seat-standard, and when the device is not in use the jaws may be hooked up or connected with any convenient part of the apparatus, so as to be out of the way.

When it is desired to lock the wheel, the jaws are passed around the mud-guard or shield and under the inner side of the tire between the spokes and their ends connected together and locked by means of the spring-catch, the universal joint connection between the bracket and jaws permitting the jaws to be moved in any direction, so that they may be passed around the wheel-tire with ease and facility.

Having thus described my invention, what I claim is—

A locking attachment for velocipedes, consisting of a pair of spring-actuated pivoted jaws having a spring locking device at their free ends, a short arm pivoted to one of said jaws, a long arm pivoted to a bracket adapted to be secured to a seat-standard, and a pivoted or hinge connection connecting said bars at right angles to the connections of the bracket and jaw, forming a universal joint, substantially as described.

In testimony that I claim the foregoing as my own I have hereunto affixed my signature in presence of two witnesses.

FREDERICK H. HOHOFF.

Witnesses:
 AUGUST PETERSON,
 BENNETT S. JONES.